25647

June 18, 1963 A. E. MANN ET AL 3,094,439

SOLAR CELL SYSTEM

Filed July 24, 1961

INVENTORS
ALFRED E. MANN
MICHAEL B. DUBEY
SAUL SHUSTER
MARTIN WOLF
EUGENE L. RALPH
ROBERT L. OLIVER

BY Elliott & Pastoriza
ATTORNEYS

United States Patent Office 3,094,439

Patented June 18, 1963

3,094,439

SOLAR CELL SYSTEM

Alfred E. Mann and Michael B. Dubey, North Hollywood, Martin Wolf, Altadena, Eugene L. Ralph, San Gabriel, Robert L. Oliver, Inglewood, and Saul Shuster, Northridge, Calif., assignors to Spectrolab, a Division of Textron Electronics, Inc., a corporation of Delaware Filed July 24, 1961, Ser. No. 126,247
6 Claims. (Cl. 136—89)

This invention relates to an improved solar cell system for converting solar energy into electrical energy.

Adequate electrical power for operating satellite instruments requires a relatively large solar sensitive area for conversion of solar energy into electrical power. As a practical matter, the provision of a large area is achieved by providing a very large number of separate solar cells in side by side relationship to form an overall array. Sufficient current is attained by paralleling a great number of cells together. Sufficient voltage, in turn, is provided by connecting a large number of the cells in series with each other. The array thus comprises a parallel-series matrix.

Generally, each cell is of a rectangular shape and includes a conducting lower surface usually comprising solder to which one terminal connection is made. The upper surface of the cell constitutes the solar sensitive surface and includes suitable current pickup means to which the other terminal is connected. The desired series electrical connections between the cells can be effected and has been effected in the past by providing a shingled structure wherein the bottom end surface of one cell overlaps the top end surface of an adjacent cell. This arrangement provides relatively good electrical contact between adjacent cells with minimum possibility of inadvertently shunting any one cell. On the other hand, the shingled arrangement involves an overlap of approximately ten percent of the usable cell surface. This fact coupled with the resulting slant of the cells decreases the effective overall sensitive area for a given number of cells as compared to the area that would be available if all of the separate cells were coplanar.

Another problem with shingled arrays is that if one cell should become defective, it is necessary to remove several cells in order to replace the one damaged cell. Further, with the cells cemented directly to each other, the overall array is rigid and subject to cracking or breaking under thermal or vibrational shocks.

In instances wherein a large number of cells have been placed in coplanar relationship, complicated interwiring circuits between the cells have been required to provide the desired series and parallel connections. Such multiple connections not only decrease the reliability of the overall structure, but add considerably to the manufacturing expense of large solar cell systems.

With the foregoing in mind, it is a primary object of this invention to provide a vastly improved solar cell system in which all of the above noted problems are either overcome or substantially diminished.

More particularly, it is an object to provide a solar cell system which provides an increased active area for a given number of cells and yet in which series and parallel interconnections are reliable and economical.

Another important object is to provide an improved solar cell array of given capacity which is of substantially less weight than known cell arrays of equivalent capacity.

Still another object is to provide an improved array which is relatively resistant to both thermal and vibrational shock.

Another object is to provide a solar cell array in which all of the cells are co-planar with the subsequent advantage of easy removal and easy replacement of any one cell.

A particular object of the invention is to provide an improved solar cell unit so designed as to optimize the withdrawal of current therefrom with a minimization of eclipsing of active surface area of the cell to the end that the overall efficiency of any one unit cell is greatly increased.

Briefly, these and many other objects and advantages of this invention are attained by providing a cell system comprising coplanar adjacent rows, each row including a plurality of solar cells in side by side coplanar relationship with each other and with the rows. Suitable contact means in the form of elongated flexible strips passing between the rows serve to connect the cells in each row in parallel with each other, and also connect the cells in one row in series with the cells in the next adjacent row.

In a preferred embodiment, the strips have an upturned flange extending between adjacent rows and include tab elements bent ninety degrees to engage the top surfaces of the side by side cells in the next adjacent row. With this arrangement, the cells may be disposed very close to each other and yet a reliable electrical connection is insured. Further, the cells may be individually adhesively mounted and because of the flexibility of the connecting strips, the overall array is thus much more resistant to thermal and vibrational shocks.

In accordance with an important feature of the invention, each unit cell itself includes current pickup means on its surface in the form of a printed circuit wherein current is conducted to corner terminal points along a pickup circuit path which tapers in width so as to provide a relatively constant current density. By such an arrangement, the sensitive area eclipsed by the printed circuit is minimized for a given current output.

A better understanding of the invention will be had by now referring to a preferred embodiment thereof as illustrated in the accompanying drawings, in which.

Figures 1, 2, 3, 4:
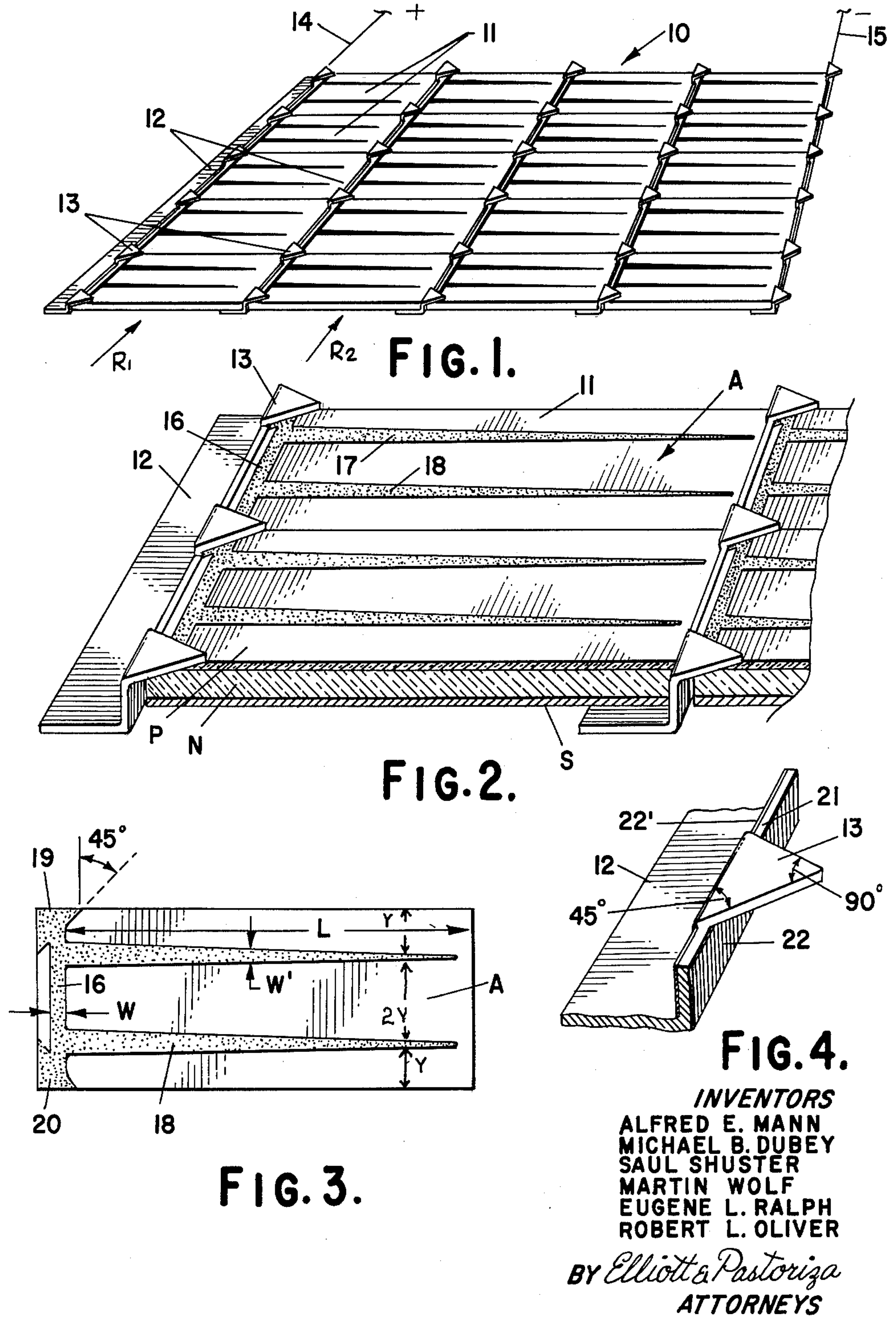
FIGURE 1 is a perspective view of a solar cell system in accordance with the present invention.
FIGURE 2 is a greatly enlarged perspective view of a portion of the structure of FIGURE 1.
FIGURE 3 is a top plan view of one of the unit cells incorporated in the system of FIGURES 1 and 2; and, FIGURE 4 is an enlarged fragmentary perspective view of a portion of one of the contacting means illustrated in FIGURES 1 and 2.

Referring first to FIGURE 1, the solar cell system includes a plurality of adjacent rows of cells, such as shown at R1 and R2, each row including a plurality of side by side cells. The side by side cells in each row are coplanar with each other and with the cells in the adjacent rows.

The various rows include connecting means in the form of elongated flexible strips 12 having under portions arranged to engage in electrical relationship the under end portions of the side by side cells in one row, and upper contacting means in the form of bent tabs 13 for engaging upper end surface portions of the cells in the next adjacent row. With this arrangement, the strips 12 serve to connect the various cells in each row in parallel with each other, and the tabs 13 serve to connect adjacent rows in series with each other.

One end of the array connects to a terminal lead 14, indicated as positive, and the other end of the array connects to a negative terminal lead 15.

A clearer understanding of the construction will be had by referring to FIGURE 2 which illustrates two side by side cells in one of the rows. As shown, the bent tab elements 13 are arranged to engage conducting circuit means on the top surface of the cells. These circuit means comprise a transverse conducting path 16 along one end of the cell as shown. Pickup current paths 17 and 18 respectively extend normally from the transverse path 16 towards the opposite end of the cell. These current paths taper as shown, the purpose for which will become clearer as the description proceeds.

Each cell is made up of negative "N" material and positive "P" material, the underside of the cell constituting a conducting surface S which may comprise solder. The top side A of the cells constitutes the solar sensitive surface.

With reference to FIGURE 3, the transverse path 16 terminates at the upper end corners in enlarged terminal areas 19 and 20, as shown. Preferably, these areas are triangularly shaped to conform to half of the triangular shape of each of the tabs 13. The transverse path is provided with a given width $w$ corresponding to the initial width of the pickup paths 17 and 18. The widths of each of the pickup paths 17 and 18 narrow as indicated at $w'$ towards a point in the direction of the opposite end of the cell along the length L. By this arrangement, the current density within the respective paths 17 and 18 may be made substantially constant since the current is drawn from the left end of the cell as viewed in FIGURE 3, and the total number of electrons will increase along the pickup paths 17 and 18 as the distance towards the transverse path and end terminals decreases.

Maximum current pickup is realized by spacing the two pickup paths 17 and 18 such that the distance Y between each pickup path and its adjacent longitudinal edge of the cell 11, are equal, and the transverse distance 2Y between the paths 17 and 18 is twice this first mentioned distance. With such dimensioning, each of the pickup paths 17 and 18 will draw electrons from approximately half of the top surface of the area of the cell 11 so that with both paths the entire surface is provided with a means for conducting current generated therein to the corner terminals.

Referring now to FIGURE 4, there is illustrated in enlarged fragmentary form the strip 12 wherien it will be noted that the main strip portion is arranged to engage the soldered under end portions of the cells as described in FIGURE 2, and wherein the top tabs 13 are triangularly shaped. The strip 12 includes an upturned flange 21 which extends vertically between the adjacent rows of cells. This flange may be provided with an insulated coating on both sides as indicated at 22 and 22' to prevent shunting of the top and bottom surfaces of any cells abutting against the upturned flange.

The apex of the triangularly shaped tab 13 as clearly seen in FIGURE 2 lies along the dividing line between adjacent cells so that approximately half the triangular area engages adjacent corners of the adjacent cells. Thus, the triangular terminal areas 19 and 20 shown in FIGURE 3 need be of an area only half that of the triangular area of the tab.

By providing contact at each of the corners, a redundancy is provided which will insure not only excellent reliability but also maximum effectiveness in removing the current picked up by the conducting paths.

Also by individually cementing the cells to the strips in side by side relationship in adjacent rows, they will be held together in a more flexible manner, the actual assemblage being secured by the strip itself which is flexible. Thus, the entire array is more resistant to thermal and vibrational shock than is the case where the cells are directly connected as in the shingled structures used heretofore.

Further, it should be noted that if it is desired to remove a defective cell, it is only necessary to unsolder the end tabs and pry them upwardly. The old cell is then removed and a new cell cemented in place. The tabs 13 are then bent downwardly to engage the same.

The operation of the foregoing described solar cell system will be evident. The various side by side cells as stated are all connected in parallel through the strips 12 so that their currents will all add. The various rows themselves are connected in series through the tabs 13 so that the voltages developed across each cell will add.

In use, several separate arrays in the form of modules may be made up and placed in side by side relationship to form an exceedingly large surface area. Electricity generated as a consequence of solar radiation impinging on the sensitive surfaces of the various cells may then be used to drive electrical equipment in a conventional manner.

While only one particular embodiment of the solar cell system of this invention has been set forth and described, various changes that fall clearly within the scope and spirit of the invention will occur to those skilled in the art. The solar cell unit itself as well as the solar cell system is, therefore, not to be thought of as limited to the particular embodiment set forth merely for illustrative purpose.

What is claimed is:

1. A solar cell system comprising, in combination: a solar cell array including a plurality of coplanar adjacent rows of solar cells, each row including a plurality of cells in side by side coplanar relationship; and a plurality of elongated flexible strips separating said rows, each strip running beneath and electrically engaging the under end portions of the side by side cells in one row and including an upturned flange extending between said row and the next adjacent row, said upturned flange including tab elements bent at right angles to overlie and electrically engage upper end portions of the side by side cells in said next adjacent row whereby the cells in each row are connected in parallel and the paralleled cells of each row are connected through said strips in series with the cells in the next adjacent row and whereby flexibility in the connections is provided by said strips so that a relatively non-rigid array results.

2. A system according to claim 1, in which each cell has a conductive circuit on its upper surface including enlarged terminal areas at the corners of one end for engagement by portions of said tab elements; a transverse circuit connecting said terminal areas running across the top end surface of said cell between said top corners; and at least one elongated pickup circuit running longitudinally from said transverse circuit towards the opposite end of said cell, said pickup circuit narrowing in width as it approaches said opposite end so that the current density in said circuit is substantially constant.

3. A system according to claim 2, in which opposite sides of said upturned flange are coated with insulation.

4. A system according to claim 3, in which said tab elements are triangular in shape with one apex of the triangle falling on the dividing line between side by side cells, said terminal areas being triangularly shaped and each of an area one-half that of the tab for engagement by one-half of the triangular shape of said tab whereby each of said tab elements engages adjacent top corners of said side by side cells.

5. A rectangular solar cell having a bottom conducting surface and a top solar sensitive surface and including a printed circuit on its top surface comprising: a transverse path between upper corners of said cell at one end, said path having a given width and terminating in enlarged terminal areas at said corners; and at least one elongated pickup path extending normally from said transverse path towards the opposite end of said cell, said pickup path having an initial width equal to said given width at the point where it leaves said transverse path, said pickup path then tapering towards a point as it approaches said opposite end whereby the current density in said pickup path is substantially constant.

6. A cell according to claim 5, including an additional pickup path extending normally from said transverse path in parallel relationship to said first mentioned pickup path, the transverse distance between each pickup path and its adjacent longitudinal edge of said cell being equal and the distance between said paths being equal to twice said first mentioned distance.

References Cited in the file of this patent

UNITED STATES PATENTS

| | | |
|---|---|---|
| 2,428,537 | Veszi et al. | Oct. 7, 1947 |
| 2,537,256 | Brittain | Jan. 9, 1951 |
| 2,820,841 | Carlson et al. | Jan. 21, 1958 |
| 2,989,575 | Wallace | June 20, 1961 |
| 2,999,240 | Nicoll | Sept. 5, 1961 |